United States Patent
Osawa (10) Patent No.: US 12,353,623 B2
(45) Date of Patent: Jul. 8, 2025

(54) DISPLAY DEVICE, CONTROL METHOD AND NON-TRANSITORY COMPUTER READABLE MEDIUM

(71) Applicant: CANON KABUSHIKI KAISHA, Tokyo (JP)

(72) Inventor: Kazuharu Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/641,690

(22) Filed: Apr. 22, 2024

(65) Prior Publication Data

US 2024/0377883 A1   Nov. 14, 2024

(30) Foreign Application Priority Data

May 12, 2023   (JP) .................... 2023-079399

(51) Int. Cl.
*G06F 3/01*   (2006.01)
*G06T 7/70*   (2017.01)

(52) U.S. Cl.
CPC ............ *G06F 3/013* (2013.01); *G06T 7/70* (2017.01); *G06T 2207/30196* (2013.01)

(58) Field of Classification Search
CPC ........... G06F 3/013; G06F 3/012; G06F 3/011
See application file for complete search history.

(56) References Cited

U.S. PATENT DOCUMENTS

| | | | |
|---|---|---|---|
| 11,157,078 B2 | 10/2021 | Sazuka | |
| 2011/0170067 A1* | 7/2011 | Sato | A61B 5/7445 345/157 |
| 2022/0353426 A1* | 11/2022 | Horie | H04N 23/63 |
| 2023/0266820 A1* | 8/2023 | Uchida | G02B 30/22 345/156 |
| 2024/0114228 A1 | 4/2024 | Tateishi | |

FOREIGN PATENT DOCUMENTS

JP   2010-232718 A   10/2010
JP   2010-262232 A   11/2010

* cited by examiner

*Primary Examiner* — Van N Chow
(74) *Attorney, Agent, or Firm* — Venable LLP (57) ABSTRACT

A display device includes a display configured to display an image. The display places an eyeball position in a state other than a predetermined state by performing first control of moving at least one of a display position of the image and a first member of the display to a first target position in a case where the eyeball position is in the predetermined state, and performs control of causing the display to display at least one of an index indicating a position gazed at by the user and an instruction for the user after the first control, and then perform second control of moving at least one of the display position of the image and the first member at a second target position based on a reaction of the user.

12 Claims, 8 Drawing Sheets

DISPLAY DEVICE, CONTROL METHOD AND NON-TRANSITORY COMPUTER READABLE MEDIUM

BACKGROUND OF THE INVENTION

Field of the Invention

The present invention relates to a display device, a control method and a non-transitory computer readable medium.

Description of the Related Art

A Head Mount Display (hereinafter, referred to as an "HMD") includes display members (such as ocular lenses and displays) to make an image visible for a user. Generally, when a difference between display images (or the display members) and eyeball positions of the user is great, image quality of an image visually recognized by the user deteriorates.

Furthermore, an interval between left and right eyeballs of a user varies per individual. To prevent deterioration of image quality caused by this variation, it is necessary to adjust the positions of display images or display members according to the interval between the left and right eyeballs. Japanese Patent Application Publication No. 2010-232718 describes an HMD that includes a camera that acquires an eyeball position, and adjusts the positions of a display image and a display member according to the acquired eyeball position.

Note that it is necessary to accurately detect eyeball positions to accurately adjust the position of a display image or a display member. Furthermore, it is necessary to display an instruction or an index for a user to detect these eyeball positions. However, the instruction or the index is displayed before position adjustment of the display member or the like. In such a case, the instruction or the index has poor visibility, a user cannot appropriately visually recognize the instruction or the index, and eyeball position detection accuracy is likely to deteriorate. Hence, there has been a case where a display image or a display member cannot be arranged at an appropriate position.

SUMMARY OF THE INVENTION

The present invention provides a technique that can arrange display images, lenses, displays, or the like at more appropriate positions for eyeballs.

One aspect of the present invention provides a display device including: a display configured to display an image; a processor; and a memory storing a program which, when executed by the processor, causes processor to acquire an eyeball position of a user, place the eyeball position in a state other than a predetermined state by performing first control of moving at least one of a display position of the image and a first member of the display to a first target position in a case where the eyeball position is in the predetermined state, and perform control of causing the display to display at least one of an index indicating a position gazed at by the user and an instruction for the user after the first control, and then perform second control of moving at least one of the display position of the image and the first member at a second target position based on a reaction of the user.

One aspect of the present invention provides a control method of a display device including a display configured to display an image, the control method including: acquiring an eyeball position of a user; placing the eyeball position in a state other than a predetermined state by performing first control of moving at least one of a display position of the image and a first member of the display to a first target position in a case where the eyeball position is in the predetermined state; and performing control of causing the display to display at least one of an index indicating a position gazed at by the user and an instruction for the user after the first control, and then perform second control of moving at least one of the display position of the image and the first member at a second target position based on a reaction of the user.

Further features of the present invention will become apparent from the following description of exemplary embodiments with reference to the attached drawings.

DESCRIPTION OF THE EMBODIMENTS

Embodiments for carrying out the present invention will be described below with reference to the drawings.

Embodiment 1

Figure 1A:
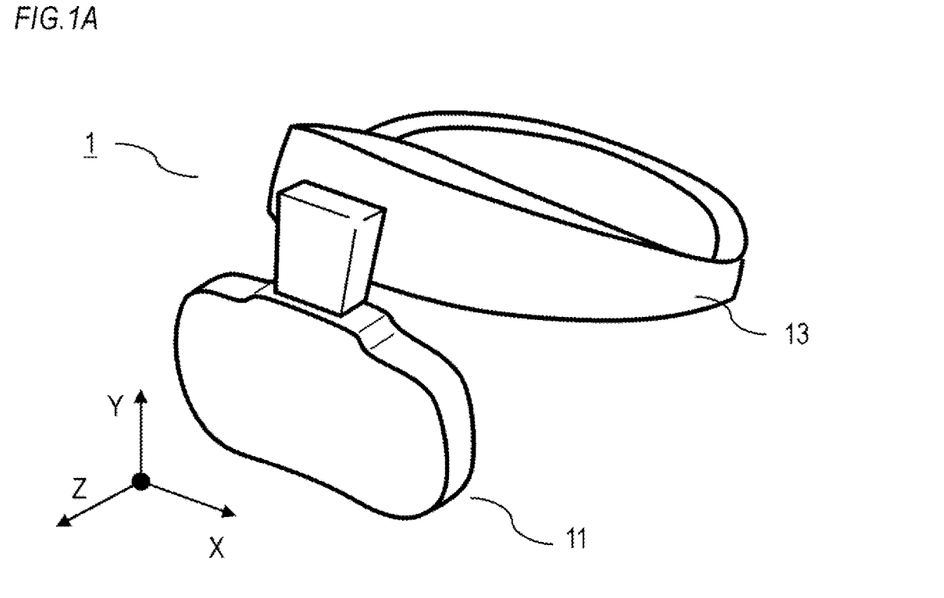
FIGS. 1A and 1B are views illustrating a configuration of an HMD according to Embodiment 1.
Figure 1B:
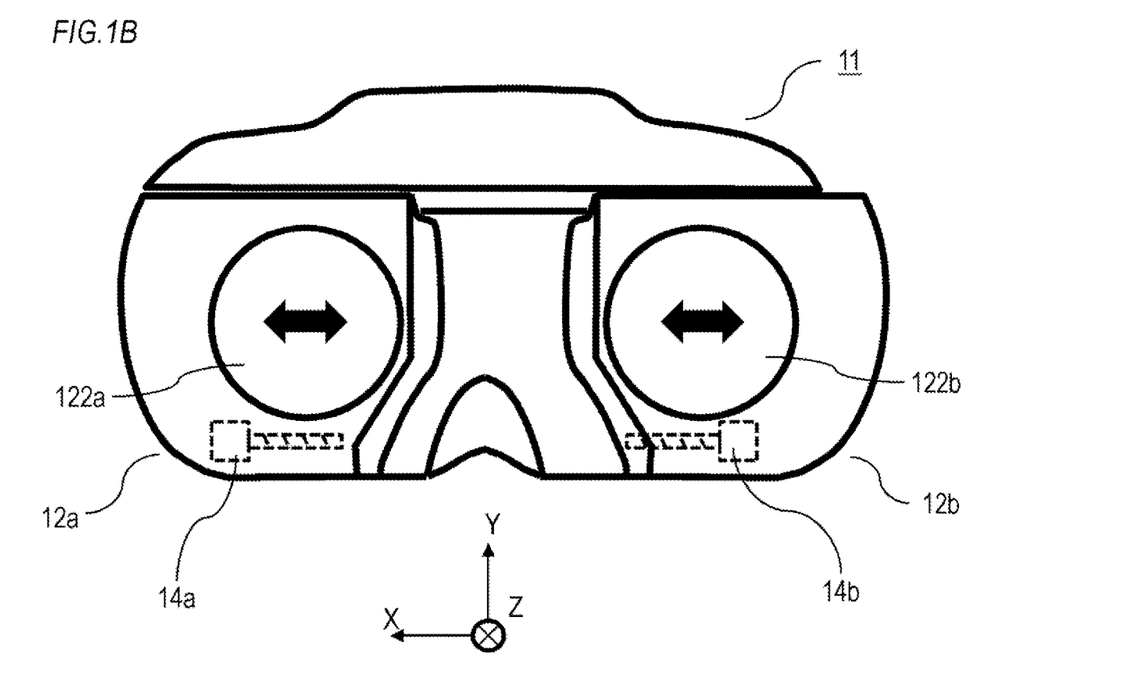
Figure 2A:
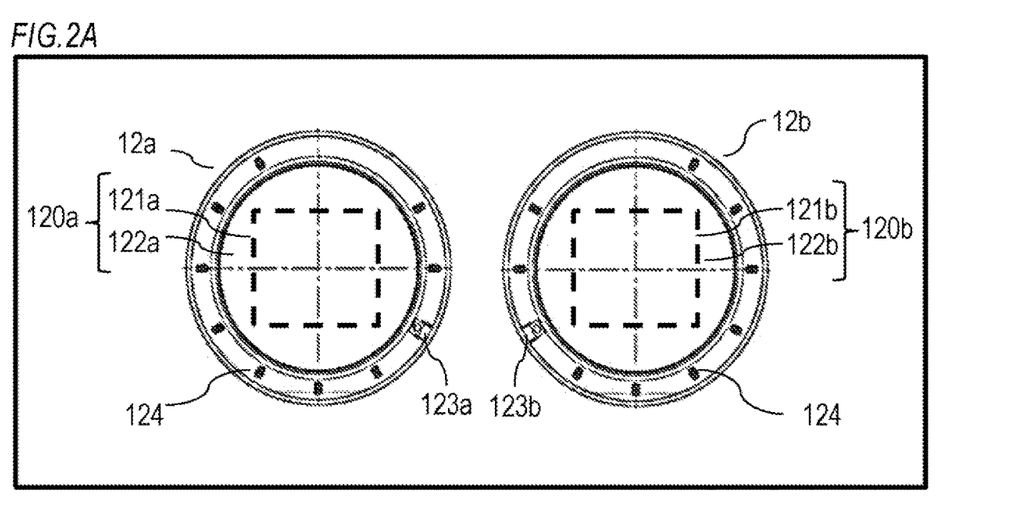
FIGS. 2A and 2B are views for describing the configuration of the HMD according to Embodiment 1.
Figure 2B:
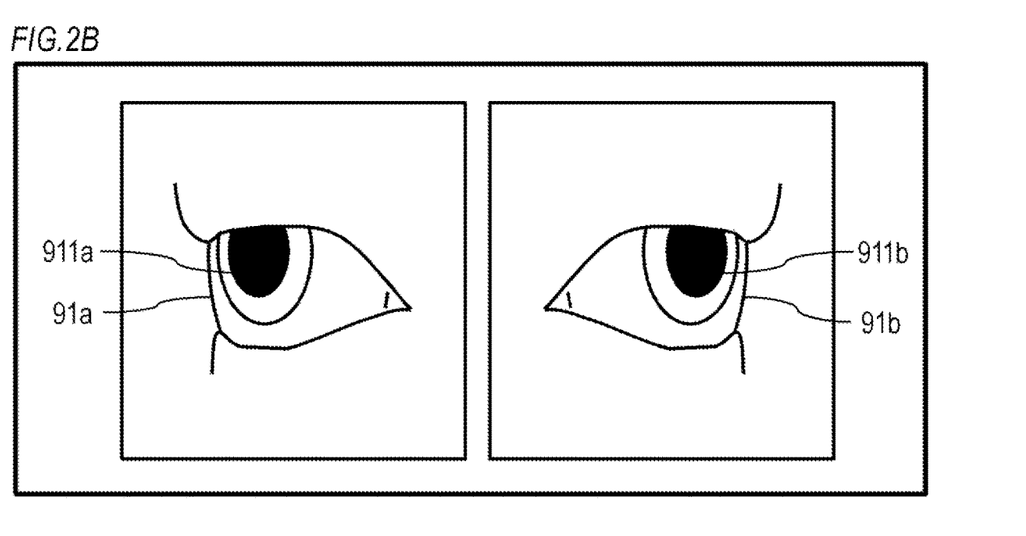

First, an HMD1 according to Embodiment 1 will be described. The structure of the HMD 1 will be described with reference to FIGS. 1A, 1B, 2A, and 2B. FIG. 1A is an external view of the HMD 1. FIG. 1B is an external view of an HMD main body 11 included in the HMD 1. FIG. 2A is a view illustrating components (a display 121a, a display 121b, an ocular lens 122a, an ocular lens 122b, an eyeball camera (image sensor) 123a, and an eyeball camera 123b) included in the HMD 1. FIG. 2B illustrates images of a left eyeball 91a and a right eyeball 91b.

Note that, hereinafter, as illustrated in FIGS. 1A and 1B, a left/right direction seen from a user will be referred to as an "X direction", an upper/lower direction will be referred to as a "Y direction", and a front/rear direction (visual line direction) will be referred to as a "Z direction".

The HMD 1 is a display device attached to the head of the user. As illustrated in FIG. 1A, the HMD 1 includes the HMD main body 11 and an attachment mechanism 13. The HMD main body 11 is held by the attachment mechanism 13, and is arranged in front of the eyes of the user. The attachment mechanism 13 is a headband-like member that is fixed to the head of the user.

As illustrated in FIG. 1B, the HMD main body 11 includes a display unit 12a that displays an image (an image for the left eyeball) that meets the left eyeball of the user, and a display unit 12b that displays an image (an image for the right eyeball) that meets the right eyeball of the user. Each of the display unit 12a and the display unit 12b includes a display member. Furthermore, the HMD main body 11 includes a rotation motor 14a as a driving unit that drives the display unit 12a in the X direction, and includes a rotation motor 14b as a driving unit that drives the display unit 12b in the X direction.

FIG. 2A is a view illustrating the display members included in the display unit 12a and the display unit 12b. The left display unit 12a includes the display 121a and the ocular lens 122a. The right display unit 12b includes the display 121b and the ocular lens 122b. Hereinafter, the display 121a and the ocular lens 122a will be collectively referred to as a "display member 120a". The display 121b and the ocular lens 122b will be collectively referred to as a "display member 120b".

Each of the display 121a and the display 121b displays a display image. The user looks at the display image through the ocular lens 122a and the ocular lens 122b. Each of the left display unit 12a and the right display unit 12b includes a plurality of IRED elements 124 that project infrared light to the eyeball of the user. The left display unit 12a includes the eyeball camera 123a (imaging unit) that observes the left eyeball. The right display unit 12b includes the eyeball camera 123b (imaging unit) that observes the right eyeball.

FIG. 2B illustrates an image of the left eyeball 91a of the user imaged by the eyeball camera 123a, and an image of the right eyeball 91b of the user imaged by the eyeball camera 123b. The eyeball camera 123a observes an outline of a left pupil 911a and reflected light of infrared light, and acquires a two-dimensional or three-dimensional relative position of the eyeball 91a with respect to the display unit 12a. The eyeball camera 123b also acquires a two-dimensional or three-dimensional relative position of the eyeball 91b with respect to the display unit 12b similar to the eyeball camera 123a.

According to the above-described configuration, the HMD 1 drives the rotation motor 14a and the rotation motor 14b according to the positions of the eyeball 91a and the eyeball 91b, and respectively drives the display unit 12a and the display unit 12b in the X direction. Consequently, it is possible to accurately arrange the display member 120a in front of the left eyeball 91a and the display member 120b in front of the right eyeball 91b. Note that, when the rotation motor 14a and the rotation motor 14b drive the display member 120a and the display member 120b, a display image also simultaneously moves in the X direction.

Figure 3A:
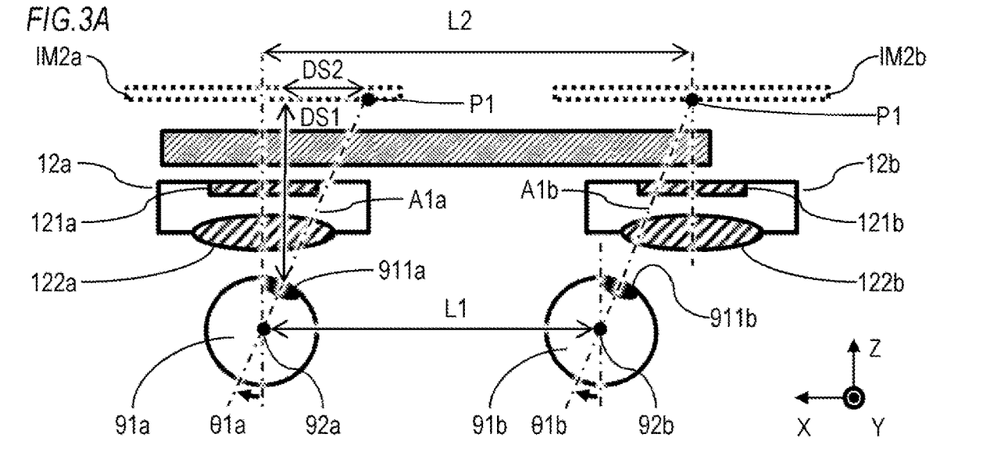
FIGS. 3A to 3D are views for describing a problem that occurs in the HMD.
Figure 3B:
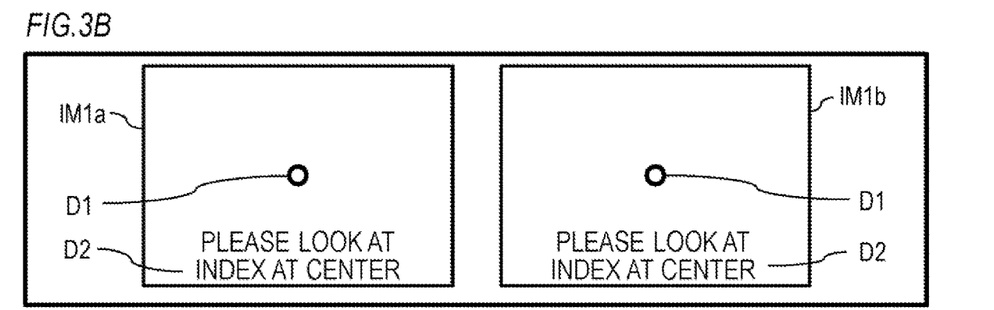

Here, a problem of the above HMD 1 will be described with reference to FIGS. 3A to 3D. FIG. 3A is a view illustrating the display members (the display member 120a and the display member 120b) and the eyeballs (the eyeball 91a and the eyeball 91b) seen from the Y direction. FIG. 3B illustrates a display image IM1a to be displayed on the display 121a and a display image IM1b to be displayed on the display 121b.

Figure 3C:
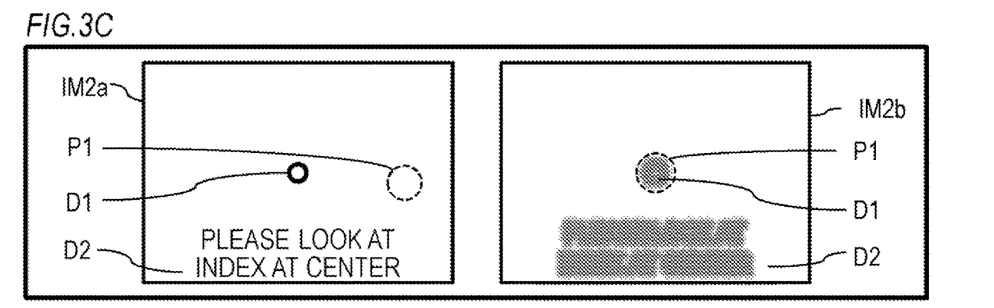
Figure 3D:
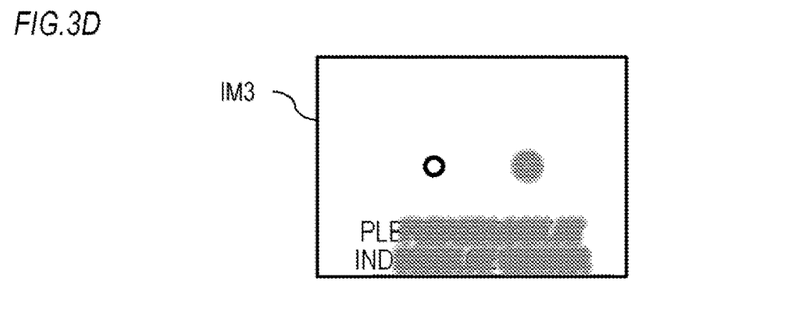

FIG. 3D illustrates an image IM3 recognized by the user when the user simultaneously looks at the display image IM1a and the display image IM1b with the eyeball 91a and the eyeball 91b. That is, the image IM3 is an image recognized by the user when the perception image IM2a and the perception image IM2b are synthesized in the brain of the user.

In FIG. 3A, the display member 120a (the display 121a and the ocular lens 122a) is arranged in front of the left eyeball 91a in the Z direction without being shifted in the X direction. On the other hand, the display member 120b (the display 121b and the ocular lens 122b) is significantly shifted in the X direction and arranged in front of the right eyeball 91b in the Z direction.

The display image IM1a displayed on the display 121a is visually recognized as the perception image IM2a by the left eyeball 91a of the user through the ocular lens 122a. The display image IM1b displayed on the display 121a is visually recognized as the perception image IM2b by the right eyeball 91b of the user through the ocular lens 122b.

Note that the center in the X direction of the display member 120a (the display 121a and the ocular lens 122a) and the center in the X direction of the display image IM1a (perception image IM2a) match at all times in the HMD 1. Hence, when the display member 120a is driven in the X direction, the display image IM1a (perception image IM2a) is also driven in the X direction simultaneously. Note that the center in the X direction of the display member 120b and the center in the X direction of the display image IM1b (perception image IM2b) match at all times. Hence, when the display member 120b is driven in the X direction, the display image IM1b (perception image IM2b) is also driven in the X direction simultaneously.

Furthermore, the eyeball camera 123a can detect the position of the pupil 911a. The eyeball camera 123b can detect the position of a pupil 911b. To accurately detect an eyeball position 92a and an eyeball position 92b of the user in FIG. 3A, the positions of the pupil 911a and the pupil 911b detected by the eyeball camera 123a and the eyeball camera 123b and, in addition, an eyeball angle θ1a and an eyeball angle θ1b are necessary.

In a state where the user is gazing at the gazing index D1 at the center, the HMD 1 can assume that the eyeball angle θ1a and the eyeball angle θ1b are known. For example, since the position of the eyeball 91a is substantially fixed by a goggle of the HMD 1, a distance DS1 between the perception image IM2a and the position of the pupil 911a is fixed to substantially a specific value. Furthermore, it is also possible to calculate a distance DS2 between a position of a gazing point P1 that is the position of the gazing index D1, and the position of the pupil 911a by referring to a captured image obtained by imaging the eyeball 91a. Furthermore, $\tan θ1a = DS2/DS1$ holds, so that it is possible to calculate the eyeball angle θ1a according to the distance DS1 and the distance DS2.

Furthermore, the eyeballs of grown-up people have substantially the same sizes. Consequently, the HMD 1 can accurately detect the eyeball position 92a on the basis of the general eyeball size, the position of the pupil 911a, and the eyeball angle θ1a. The HMD 1 can accurately detect the eyeball position 92b on the basis of the general eyeball size, the position of the pupil 911b, and the eyeball angle θ1b.

At this time, when the display image IM1a and the display member 120a (the display 121a and the ocular lens 122a) are arranged in front of the left eyeball 91a without being shifted in the X direction as illustrated in FIG. 3A, image display performance is sufficiently high. Hence, the user can visually recognize an image whose image quality of the display image IM1a is not undermined like the perception image IM2a illustrated in FIG. 3B.

On the other hand, when the display image IM1 and the display member 120b (the display 121b and the ocular lens 122b) are significantly shifted in the X direction and arranged in front of the right eyeball 91b, display performance of an image to be visually recognized lowers. There are various phenomena of a decrease in display performance, and will be described as an example of blur of an image in this application. More specifically, the displayed gazing index D1 and instruction D2 appear blurred as in the perception image IM2b illustrated in FIG. 3C, and therefore visibility lowers.

Furthermore, in general, people have difficulty in an operation of simultaneously directing a visual axis A1a and a visual axis A1b outwardly compared to a state where the left visual axis A1a and the right visual axis A1b are parallel to each other. Hence, when an interval L1 between the eyeball 91a and the eyeball 91b is shorter than a center interval L2 between (a distance between the centers) the two display members (and display positions of the two display images), the eyeball 91a and the eyeball 91b may not be able to simultaneously gaze at the left and right gazing indices D1. When, for example, the user's dominant eye is the right eyeball 91b, only the right eyeball 91b gazes at the gazing index D1, and the left eyeball 91a is directed toward a direction parallel to the visual axis A1b of the right eyeball 91a and may not be able to gaze at the gazing index D1 (see FIG. 3A).

FIGS. 3A and 3C illustrate a gazing point of the eyeball 91a in the perception image IM2a and a gazing point of the eyeball 91b in the perception image IM2a as the gazing points P1. In this example, while the left eyeball 91a gazes at the gazing index D1, the right eyeball 91b does not gaze at the gazing index D1. The left eyeball 91a that is not gazing at the gazing index D1 causes the HMD to erroneously detect the eyeball angle θ1a of the left eyeball 91a, and therefore detection accuracy of the position of the eyeball position 92a lowers.

Furthermore, when the positions of the gazing points P1 of the eyeball 91a and the eyeball 91b are different, the user recognizes that two images overlap while being shifted from each other as illustrated in FIG. 3D. Furthermore, the perception image IM2b itself visually recognized by the right eyeball 91b is also blurred due to a decrease in display performance.

As described above, when display images and the display members are appropriately arranged for the eyeballs of the user, it is likely that image visibility deteriorates and detection accuracy of the eyeball positions deteriorate.

Figure 4:
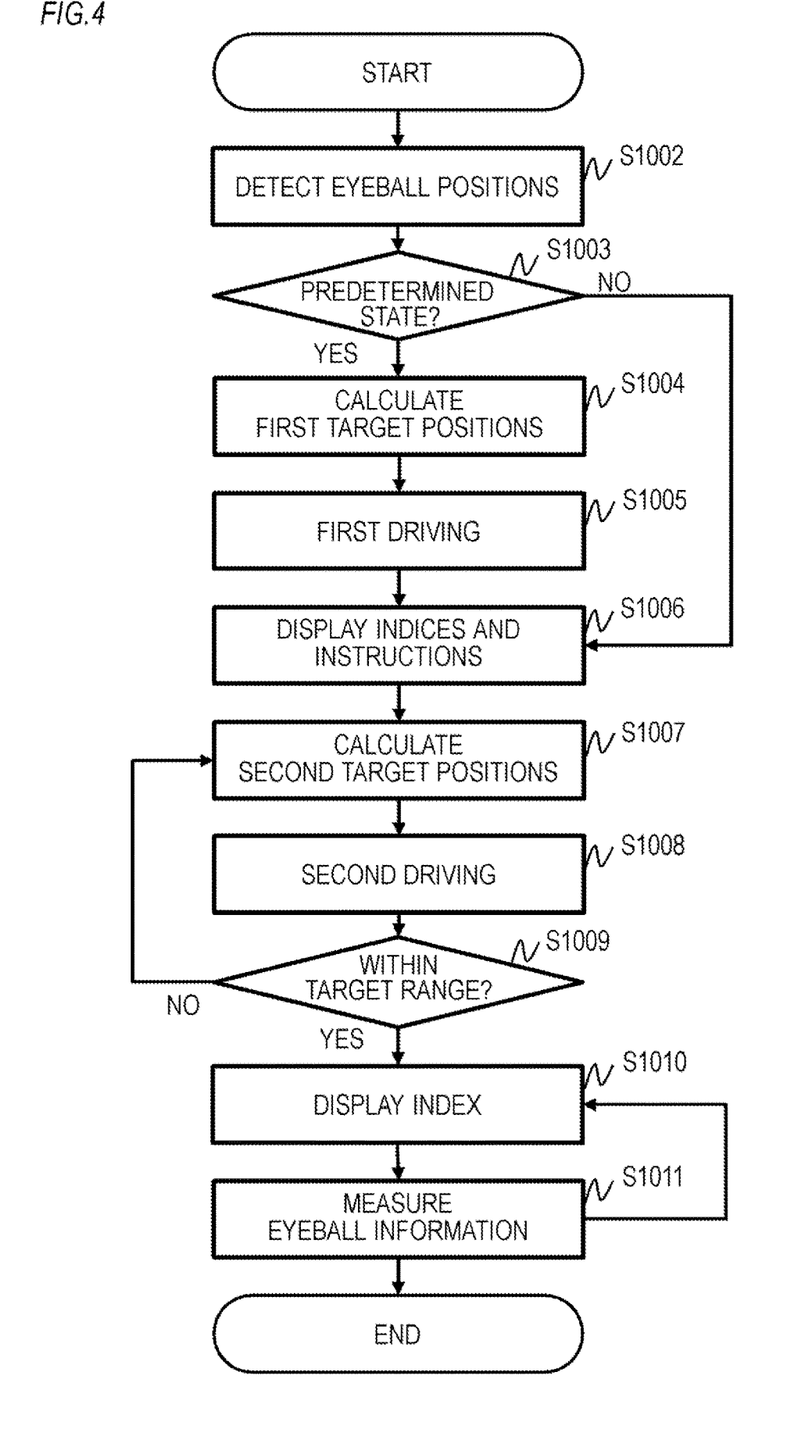
FIG. 4 is a flowchart of position adjustment processing according to Embodiment 1.

Hence, processing of adjusting the positions of the display member 120a and the display member 120b (processing of adjusting display positions of the display image IM1a and the display image IM1b) in the HMD 1 will be described with reference to a flowchart in FIG. 4. Hereinafter, the processing in the flowchart in FIG. 4 is implemented by a control unit included in the HMD 1 by executing a program. Here, the control unit is implemented by a processor.

Figure 5A:
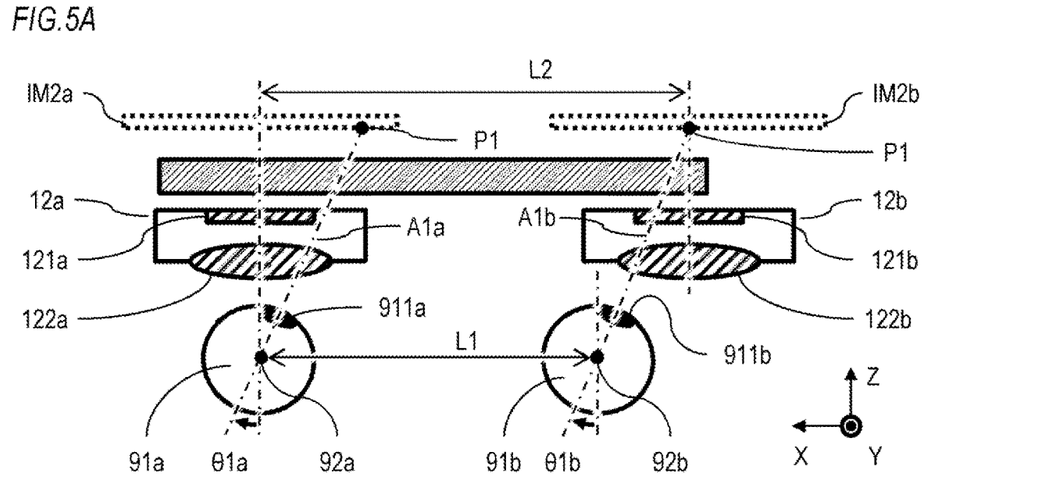
FIGS. 5A to 5D are views illustrating a state before first driving according to Embodiment 1.
Figure 5B:
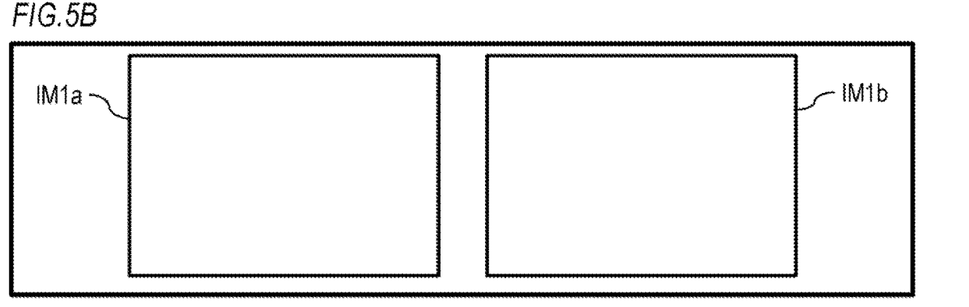
Figure 5C:
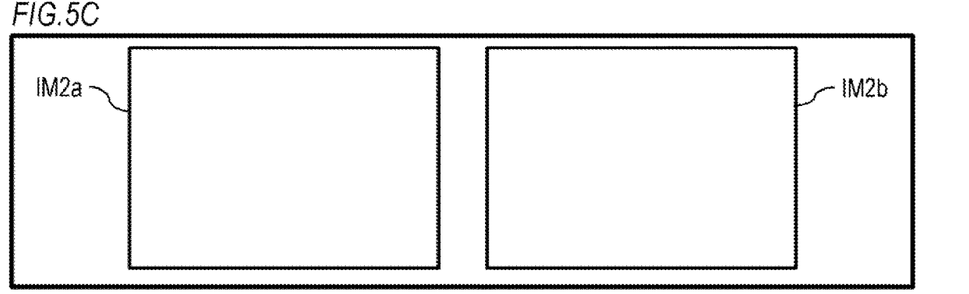
Figure 5D:
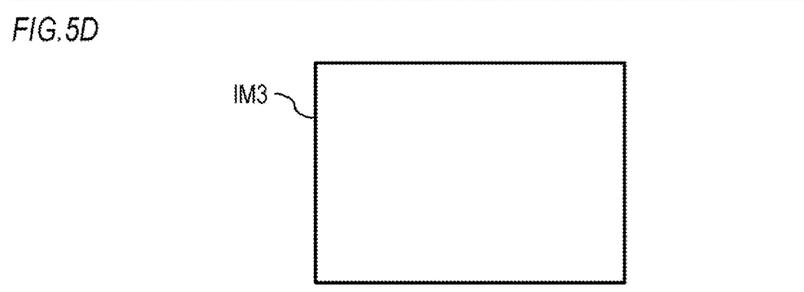

FIGS. 5A to 5D illustrate a state before the processing in the flowchart in FIG. 4 is started. A positional relationship between the display members (the display member 120a and the display member 120b) and the eyeballs (the eyeball 91a and the eyeball 91b) illustrated in FIG. 5A is the same as a positional relationship illustrated in FIG. 3A. At this point of this, as illustrated in FIG. 5B, the display image IM1a displayed on the display 121a and the display image IM1b displayed on the display 121b do not include the gazing indices D1 and the instructions D2. As a result, the user recognizes an image that does not include the gazing index D1 and the instruction D2 as illustrated in FIGS. 5C and 5D.

In step S1002, the control unit detects the eyeball 91a using the eyeball camera 123a, and detects the eyeball 91b using the eyeball camera 123b. Furthermore, the control unit detects the eyeball position 92a and the eyeball position 92b. Note that the gazing index D1 is not displayed, and therefore the eyeball angle θ1a and the eyeball angle θ1b are unknown. Therefore, detection accuracy of the eyeball position 92a and the eyeball position 92b is low.

In step S1003, the control unit determines whether or not the eyeball 91a and the eyeball 91b are in a predetermined state. The predetermined state is, for example, one of three states of a following first state to third state. These states can be determined without requiring high detection accuracy for eyeball positions even when detection accuracy is not sufficiently high.

The first state is a state where the eyeball 91a is arranged in an angle of view of the eyeball camera 123a, and the eyeball 91b is arranged in an angle of view of the eyeball camera 123b. That is, the first state is also a state where the eyeball 91a is shown in a captured image acquired by the eyeball camera 123a, and the eyeball 91b is shown in a captured image acquired by the eyeball camera 123b.

The second state is a state where the eyeball position 92a is shifted by a predetermined amount or more in the X direction from the display position of the display image IM1a, or a state where the eyeball position 92b is shifted by the predetermined amount or more in the X direction from the display position of the display image IM1b. The second state is a state where the eyeball position 92a is shifted by the predetermined amount or more in the X direction from the position of the display member 120a, or a state where the eyeball position 92b is shifted by the predetermined amount or more in the X direction from the position of the display member 120b.

The third state is a state where the center interval L1 between the eyeball 91a and the eyeball 91b is shorter than the center interval L2 between the display member 120a and the display member 120b. The third state may be a state where the center interval L1 between the eyeball 91a and the eyeball 91b is shorter than the center interval L2 between the display image IM1a and the display image IM1b.

In a case where it is determined in step S1003 that the eyeball 91a and the eyeball 91b are in the predetermined state, the flow moves to step S1004. In a case where it is determined that the eyeball 91a and the eyeball 91b are not in the predetermined state, the flow moves to step S1006.

To place the eyeball 91a and the eyeball 91b into a state other than the predetermined state in step S1004, the control unit calculates (determines) a first target position in the X direction of each of the display member 120a and the display member 120b. Here, the control unit calculates the first target positions on the basis of the eyeball position 92a and the eyeball position 92b detected in step S1002. The "first target position" is a position to which a center position of a target (the display member or the display image) is moved to resolve the above predetermined state.

When, for example, the display member 120a and the display member 120b are moved to the first target positions, the first target positions are calculated such that the center interval between the display member 120a and the display member 120b is shorter than the center interval between the eyeball position 92a and the eyeball position 92b. Alternatively, the first target positions are calculated such that a shift amount in the X direction of the display member 120a from the eyeball 91a and a shift amount in the X direction of the display member 120b from the eyeball 91b are smaller than a predetermined value.

In step S1005, the control unit places the eyeball 91a and the eyeball 91b into a state other than the predetermined state by performing first driving (first control). The first driving is processing of moving the display member 120a (display image IM1a) to the first target position by rotating the rotation motor 14a, and moving the display member 120b (display image IM1b) to the first target position by rotating the rotation motor 14b.

Figure 6A:
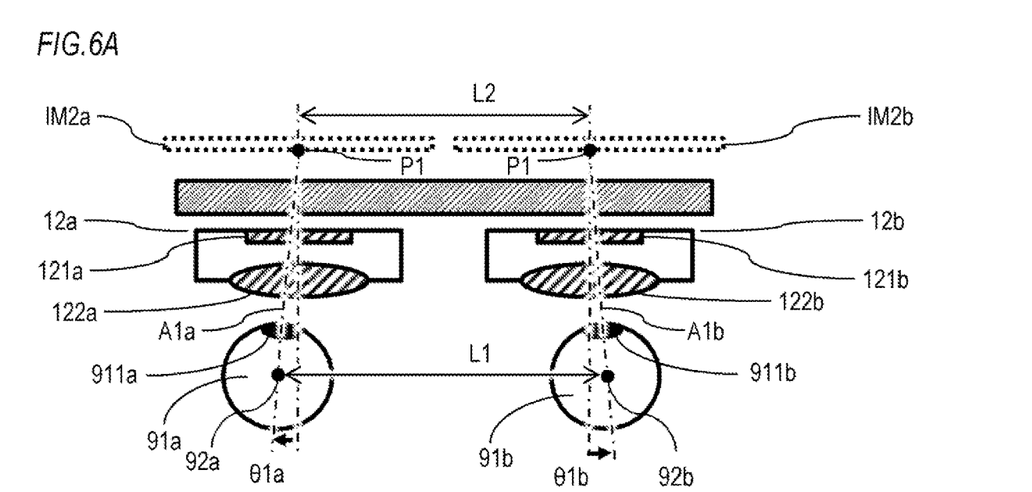
FIGS. 6A to 6D are views illustrating a state after the first driving according to Embodiment 1.
Figure 6B:
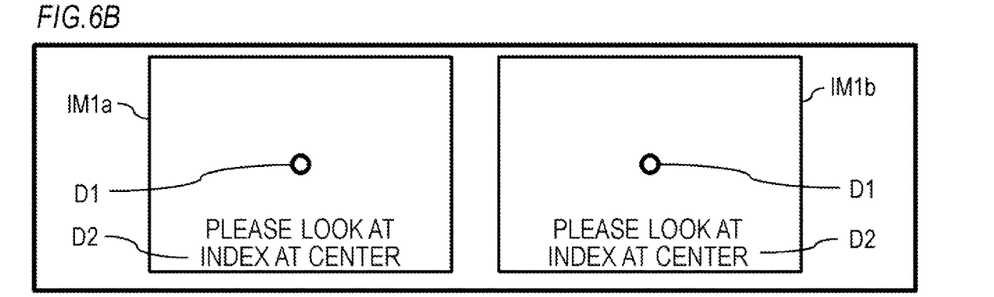

In step S1006, as illustrated in FIG. 6B, the control unit displays the display image IM1a on the display 121a, and displays the display image IM1b on the display 121b. Each of the display image IM1a and the display image IM1b includes the gazing index D1 and the instruction D2 for requesting to gaze at the gazing index D1. When the user gazes at the gazing index D1, it is possible to make the eyeball angle θ1a and the eyeball angle θ1b known as described above. Consequently, the control unit can accurately detect the eyeball position 92a and the eyeball position 92b on the basis of the eyeball angle θ1a and the eyeball angle θ1b.

Note that, in step S1005, the control unit has driven the display member 120a and the display member 120b. Hence, the shift amount in the X direction between the left eyeball 91a and the display member 120a illustrated in FIG. 6A, and the shift amount in the X direction between the right eyeball 91b and the display member 120b are smaller than the shift amount in the X direction between the right eyeball 91b and the display member 120b illustrated in FIG. 3A. Consequently, the gazing indices D1 and the instructions D2 are suppressed from being blurred in the perception image IM2a and the perception image IM2b illustrated in FIG. 6C and visually recognized by the user. Furthermore, at a point of time in step S1006, the interval L1 between the eyeball 91a and the eyeball 91b is longer than the center interval L2 between the display member 120a and the display member 120b. Hence, the visual axis A1a of the eyeball 91a and the visual axis A1b of the eyeball 91b are directed inwardly compared to a parallel state. Furthermore, each of the eyeball 91a and the eyeball 91b can easily gaze at the gazing indices D1. Furthermore, the eyeball 91a and the eyeball 91b can easily gaze at an identical position in an image, so that the user can recognize an image without blur as illustrated in FIG. 6D.

In step S1007, the control unit calculates (determines) second target positions in the X direction of the display member 120a and the display member 120b. Here, the control unit calculates the second target positions on the basis of a user's reaction made at a time when the gazing indices D1 and the instructions D2 are displayed in step S1006. In Embodiment 1, the user's reaction is a user's motion of gazing at the gazing indices D1. The "second target positions" are positions obtained by calculating the positions in the X direction of the eyeballs as targets.

Figure 6C:
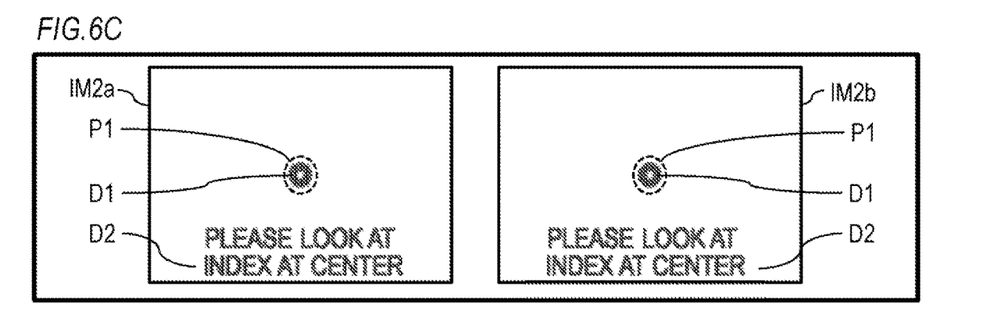
Figure 6D:
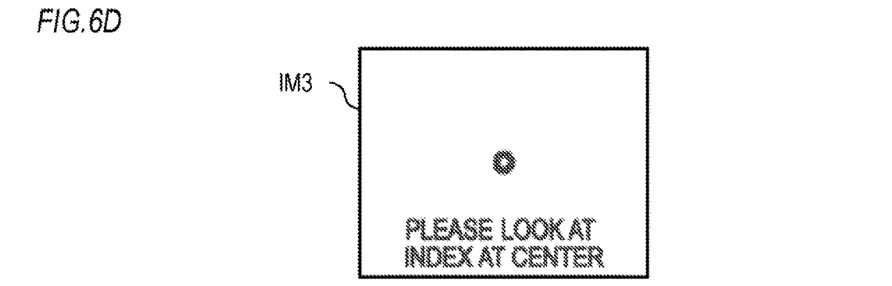

In step S1007, the eyeball 91a and the eyeball 91b appropriately gaze at the gazing indices D1 as indicated by the gazing points P1 illustrated in FIGS. 6A and 6C, so that the HMD 1 can correctly grasp the eyeball angle θ1a and the eyeball angle θ1b. Consequently, in step S1007, it is possible to detect the eyeball position 92a and the eyeball position 92b more accurately than a time of calculation of the first target positions performed in step S1004. Furthermore, a state hardly occurs where the eyeball 91a and the eyeball 91b cannot gaze at the gazing indices D1 as illustrated in FIGS. 3A and 3C, and accuracy of detection of the eyeball position 92a and the eyeball position 92b also hardly lowers. Consequently, it is possible to appropriately calculate the second target positions.

In step S1008, the control unit performs second driving (second control). Similar to the first driving, the second driving is processing of moving the display member 120a to the second target position by rotating the rotation motor 14a, and moving the display member 120b to the second target position by rotating the rotation motor 14b.

In step S1009, the control unit determines whether or not the shift amount in the X direction of the display member 120a (display image IM1a) from the left eyeball 91a and the shift amount in the X direction of the display member 120b (display image IM1b) from the right eyeball 91b are within a target range. In a case where it is determined that the two shift amounts are within the target range, the flow moves to step S1010. On the other hand, in a case where it is determined that at least one of the two shift amounts is within the target range, the flow returns to step S1007. In this case, the processing in steps S1007 and S1008 is executed again.

At a point of time at which the flow moves to step S1010, position adjustment of the display member 120a and the display member 120b has been completed. Furthermore, position adjustment of the display image IM1a and the display image IM1b has also been completed.

In step S1010, the control unit displays the gazing index D1 on each of the display 121a and the display 121b.

In step S1011, the control unit acquires eyeball information of the user. Recent HMDs have multiple functions that use user's visual line information, and need eyeball information of the users to calculate the visual line information in some cases. The eyeball information is, for example, information of the diameter of the eyeball or information of the radius of a cornea. In step S1011, the control unit acquires the eyeball information of the eyeball 91a and the eyeball information of the eyeball 91b on the basis of images obtained by the eyeball camera 123a and the eyeball camera 123b by imaging the eyeball 91a and the eyeball 91b.

The control unit repeats displaying the gazing indices D1 in step S1010 and acquiring the eyeball information in step S1011 while changing the display positions of the gazing indices D1. At a point of time of start of processing in step S1010, the display member 120a is shifted little from the eyeball 91a and arranged in the X direction, and the display member 120b is shifted little from the eyeball 91b and arranged in the X direction. Consequently, the display performance is suppressed from lowering, so that the user can visually recognize the gazing indices D1 that is not blurred.

An operation of the HMD 1 will be described below. In a state where position shift in the X direction between the eyeball position 92a and the display member 120a or position shift in the X direction between the eyeball position 92b and the display member 120b is great, when the gazing index D1 and the instruction D2 are displayed, the gazing index D1 and the instruction D2 have low visibility (see FIG. 3D). Furthermore, one of the eyeball 91a and the eyeball 91b cannot appropriately gaze at the gazing index D1, and therefore position detection accuracy of the eyeball position 92a and the eyeball position 92b is likely to become deteriorated.

By contrast with this, at a point of time before start (before the first driving) of the flowchart in FIG. 4 according to Embodiment 1, the display image IM1a and the display image IM1b do not include the gazing indices D1 and the instructions D2 as illustrated in FIG. 5B. Hence, as illustrated in FIG. 5D, an image recognized by the user has better visibility than that of the image illustrated in FIG. 3D.

In step S1005, after the first driving is performed, shift in the X direction between the eyeball position 92a and the position of the display member 120a and shift in the X direction between the eyeball position 92b and the position of the display member 120b decrease as illustrated in FIG. 6A. Consequently, visibility of the gazing indices D1 and the instructions D2 improves. From this point of time, the gazing indices D1 and the instruction D2 are displayed, so that an image illustrated in FIG. 6D and recognized by the user has better visibility than that of the image illustrated in FIG. 3D.

Furthermore, it is possible to appropriately gaze at the gazing indices D1, so that it is possible to suppress accuracy of detection of the eyeball position 92a and the eyeball position 92b from lowering. Furthermore, it is possible to arrange the display members (the display member 120a and the display member 120b) and the display images (the display image IM1a and the display image IM1b) at more appropriate positions at a time of second driving.

Note that, in the HMD 1, the center in the X direction of the display member 120a and the center in the X direction of the display image IM1a match at all times, and the center in the X direction of the display member 120b and the center in the X direction of the display image IM1b match at all times. Furthermore, the display position of the display image IM1a has also simultaneously moved together with the display member 120a, and the display position of the display image IM1b has also simultaneously moved together with the display member 120b. However, only one of the display member 120a and the display image IM1a may move, and only one of the display member 120b and the display image IM1b may move. A method for driving only the display position of the display image IM1a (display image IM1b) includes a method for changing a position at which an image of a display is arranged, and the like.

Note that the HMD 1 displays an image including both of the gazing index D1 and the instruction D2. However, the HMD 1 may display an image including only one of the gazing index D1 and the instruction D2.

Note that, in FIG. 3A, the display member 120a (display image IM1a) is shifted in the X direction from the eyeball position 92a, or the display member 120b (display image IM1b) is shifted in the X direction from the eyeball position 92b. Furthermore, the center interval between the left and right eyeballs is shorter than the center interval between the left and right display members (display positions of the left and right display images). In such a state, image visibility deteriorates, and detection accuracy of the eyeball positions deteriorates.

Hence, preferably, the above state is the predetermined state, and the first driving is performed in this state. Alternatively, a state where the eyeballs are arranged in the angles of view of the eyeball camera 123a and the eyeball camera 123b may be the predetermined state, and the first driving may be always performed.

Note that the first target positions of the display members (display images) are calculated on the basis of the eyeball positions at the time of the first driving of the HMD 1. Although there is also conceived a method for setting average eyeball positions of users as the first target positions without using the eyeball positions, this method increases a probability that the positions of the display members (display members) are not appropriate after the first driving. Note that it is preferable to calculate the first target positions of the display members (display images) on the basis of the eyeball positions at the time of the first driving.

Furthermore, when the center interval between the display member 120a and the display member 120b (the display image IM1a and the display image IM1b) is longer than the center interval between the eyeball position 92a and the eyeball position 92b, the probability that the indices cannot be appropriately gazed at as described above increases. Hence, "the first target positions that make the center interval between the display member 120a and the display member 120b (the display image IM1a and the display image IM1b) shorter than the center interval between the eyeball position 92a and the eyeball position 92b" are preferably calculated.

Note that the HMD 1 calculates the second target positions on the basis of a user's reaction acquired when at least the display image IM1a and the display image IM1b are displayed at the time of the second driving. The user's reaction is a user's motion of gazing at the gazing indices D1. Consequently, it is possible to improve accuracy of position detection of the eyeball position 92a and the eyeball position 92b, and it is possible to more appropriately arrange the display member 120a and the display member 120b with respect to the eyeball 91a and the eyeball 91b at the time of the second driving.

As described above, it is preferable to calculate the second target positions on the basis of a user's reaction acquired when at least the display image IM1a and the display image IM1b are displayed at the time of the second driving. Furthermore, preferably, the display images include the gazing indices D1, and the user's reaction is a user's motion of gazing at the gazing indices D1.

Note that the HMD 1 executes the second driving as in step S1010 and step S1011, and then measures the eyeball information of the user. The HMD1 displays the indices a plurality of times, and causes the user to gaze at the indices when measuring the eyeball information. Since this measurement is performed after the second driving, the display member 120a is arranged with little shift from the eyeball 91a, and the display member 120b is arranged with little shift from the eyeball 91b. Consequently, the gazing indices D1 displayed at the time of measurement of the eyeball information can suppress a decrease in the display performance, and enable visual recognition without blur. As described above, it is preferable to measure the eyeball information of the user after the second driving.

Although the display member 120a and the display member 120b are simultaneously driven at the time of the first driving and the second driving in the above description, only one of the display member 120a and the display member 120b may be driven. When, for example, only the display member 120a is driven, the predetermined state is a state where the eyeball 91a is arranged in the angle of view of the eyeball camera 123a or a state where the eyeball position 92a is shifted by the predetermined amount or more in the X direction from the position of the display member 120a. Furthermore, although the case where the position of the display member 120a is adjusted has been described as the case where the positions of both of the display 121a and the ocular lens 122a are adjusted, the position of one of the display 121a and the ocular lens 122a may be adjusted. In the case where the position of the display member 120b is adjusted, the position of one of the display 121b and the ocular lens 122b may be also adjusted likewise.

Embodiment 2

Next, an HMD2 according to Embodiment 2 will be described. Similar to the HMD 1, the HMD2 includes the display member 120a (the display 121a and the ocular lens 122a) and the display member 120b (the display 121b and the ocular lens 122b). Since description of each member and the structure of the HMD 2 are the same as those of the HMD 1, description thereof will be omitted.

Figure 7:
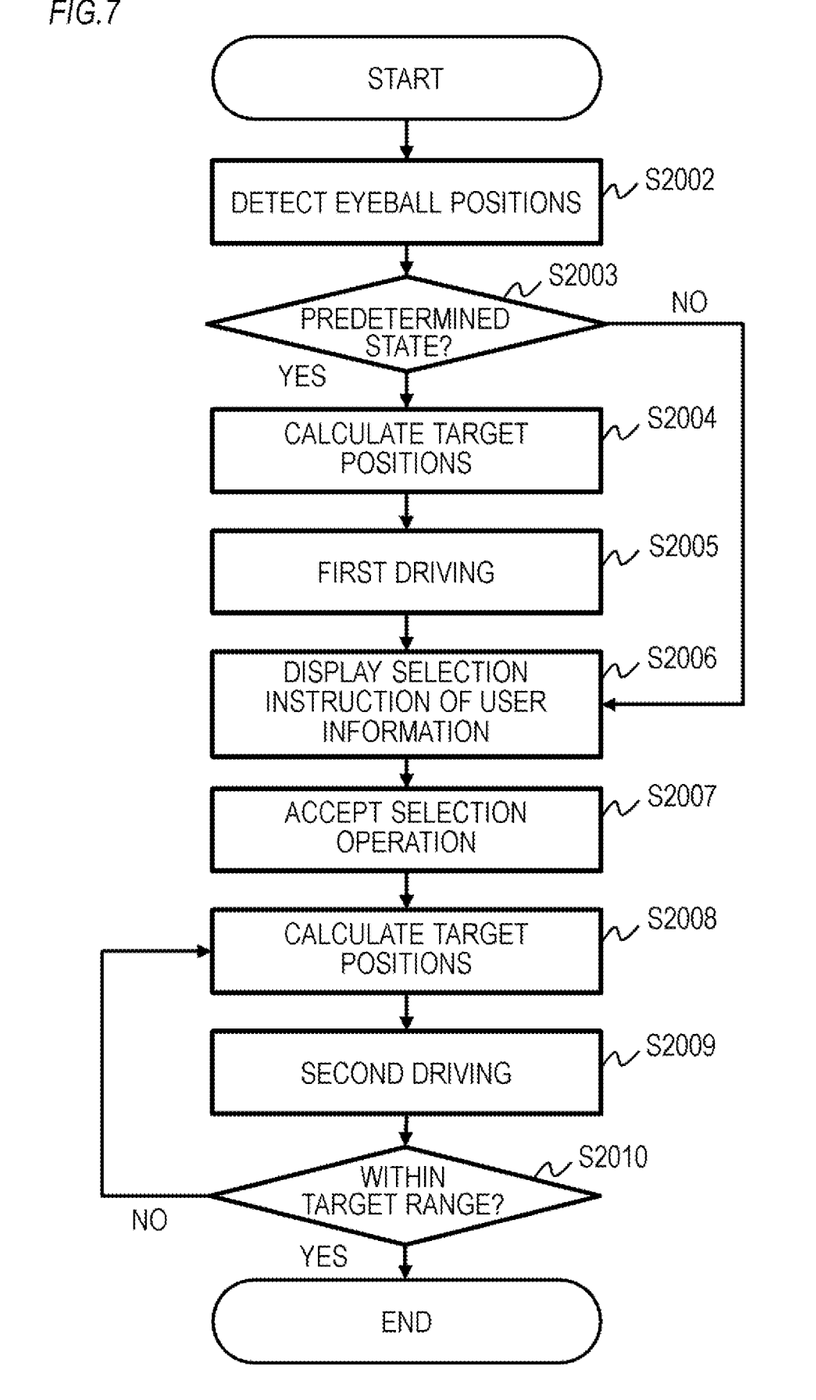
FIG. 7 is a flowchart of position adjustment processing according to Embodiment 2.

Position adjustment of the display member 120a and the display member 120b in the HMD 2 will be described with reference to FIG. 7. Since steps S2002 to S2005 in FIG. 7 are the same as steps S1002 to S1005 in FIG. 4, description thereof will be omitted.

Figure 8A:
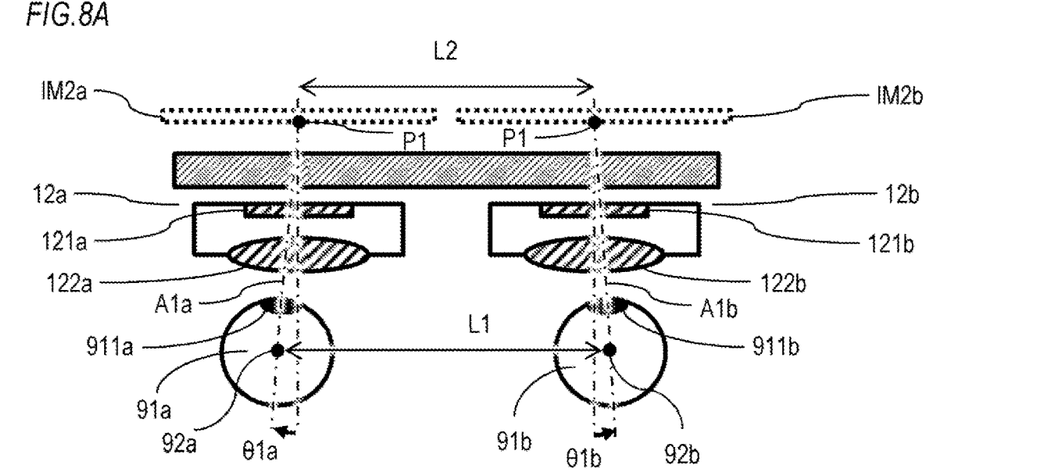
FIGS. 8A to 8D are views illustrating a state after the first driving according to Embodiment 2.

At the time of end of step S2005, the first driving is completed as illustrated in FIG. 8A. In FIG. 8A, the shift amount in the X direction of the display member 120a (display image IM1a) from the eyeball 91a is smaller than the shift amount in the X direction of the display member 120a (display image IM1a) from the left eyeball 91a illustrated in FIG. 3A. In FIG. 8A, the shift amount in the X direction of the display member 120b (display image IM1b) from the eyeball 91b is also smaller than the shift amount in the X direction of the display member 120b (display image IM1b) from the right eyeball 91b illustrated in FIG. 3A.

Figure 8B:
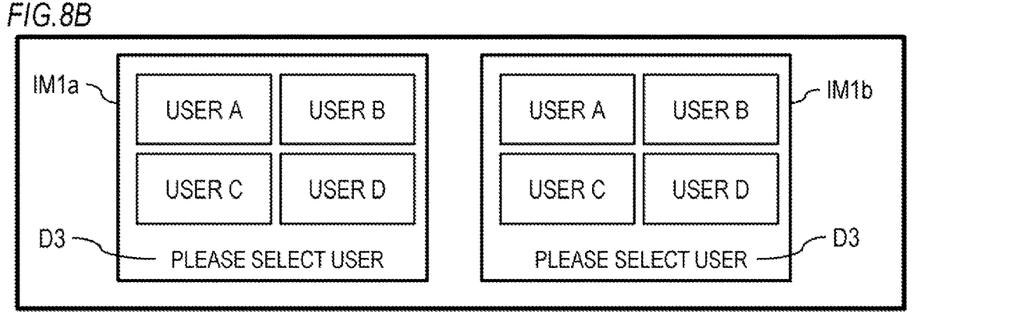
Figure 8C:
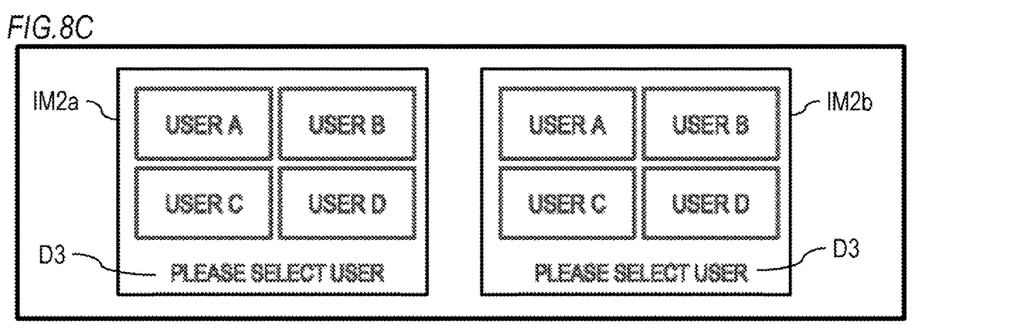
Figure 8D:
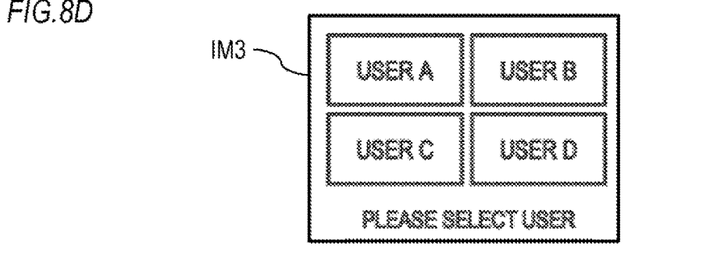

In step S2006, as illustrated in FIG. 8B, the control unit displays the display image IM1a on the display 121a, and displays the display image IM1b on the display 121b. Each of the display image IM1a and the display image IM1b includes "the instruction D3 for requesting selection of information of a user to whom the HMD 2 is attached". The display image IM1a and the display image IM1b illustrated in FIG. 8C and visually recognized by the user are suppressed from being blurred. Furthermore, the user can recognize an image without shift as illustrated in FIG. 8D by simultaneously looking at the display image IM1a and the display image IM1b with the eyeball 91a and the eyeball 91b.

In step S2007, the control unit accepts a user's operation of selecting information (information of the user).

In step S2008, the control unit calculates the second target positions at a time when the display member 120a and the display member 120b are driven in the X direction. Here, the control unit calculates the second target positions on the basis of a user's reaction made at a time when the instructions D3 are displayed in step S2006. The user's reaction according to Embodiment 2 is an operation of selecting the information of the user. When the information of the user is selected, the HMD 2 can refer to eyeball information (the eyeball information of the user measured in advance) linked to the information of the user. As described above, by using the eyeball information measured in advance, the control unit can accurately detect the positions of the eyeball position 92a and the eyeball positions 92b without "displaying the gazing indices and causing the user to gaze at the gazing indices". Consequently, the control unit can appropriately calculate the second target positions. Note that eyeball information of a plurality of users is stored in a storage unit (storage) such as a memory after the eyeball information is measured in advance. Hence, the control unit acquires the eyeball information associated with the selected user information from the eyeball information of the plurality of users stored in the storage unit.

In step S2009, the control unit performs the second driving similar to step S1008.

In step S2010, the control unit determines whether or not the shift amount in the X direction of the display member 120a (display image IM1a) from the eyeball 91a is within the target range similar to step S1009. Furthermore, the control unit determines whether or not the shift amount in the X direction of the display member 120b (display image IM1b) from the eyeball 91b is within the target range. In a case where it is determined that the two shift amounts are within the target range, processing of this flowchart is finished. In a case where it is determined that at least one of the two shift amounts is within the target range, the flow returns to step S2008.

An operation of the HMD 2 will be described below. The HMD 2 calculates the second target positions on the basis of a user's reaction acquired when the display image IM1a and the display image IM1b are displayed at the time of the second driving.

For the HMD 2, the user's reaction is selection of the information of the user unlike the HMD 1. By using the eyeball information of the user linked to the selected information of the user, it is possible to improve detection accuracy of the eyeball position 92a and the eyeball position 92b. Consequently, it is possible to more appropriately arrange the display member 120a and the display member 120b with respect to the eyeball 91a and the eyeball 91b at the time of the second driving. Furthermore, it is possible to more appropriately arrange the display image IM1a and the display image IM1b (the perception image IM2a and the perception image IM2b) with respect to the eyeball 91a and the eyeball 91b at the time of the second driving.

Note that the display member 120a and the display member 120b are the lens (optical element) and the display (retinal projection type) in each embodiment, yet are not limited to these. The display member 120a and the display member 120b may be a laser light source and a mirror (MEMS mirror) (retinal scan type). In this case, light emitted by the laser light source is reflected by the mirror, and then reaches the retinas of the user's eyes. Consequently, the display member 120a and the display member 120b draw (display) an image on the retinas of the user's eyes. Note that an arbitrary optical element that has optical power (e.g., can change a trajectory of light) may be used instead of the mirror, and, for example, a prism or a refractive optical element may be used.

Although the present invention has been described in detail on the basis of the suitable embodiments of the present invention, the present invention is not limited to these specific embodiments, and the present invention also covers various aspects without departing from the gist of the present invention. Part of the above-described embodiments may be combined as appropriate.

Furthermore, in the above description, "the flow moves to step S1 in a case where A is B or more and the flow moves to step S2 in a case where A is smaller (lower) than B" may be read as that "the flow moves to step S1 in a case where A is larger (higher) than B and the flow moves to step S2 in a case where A is B or less". By contrast with this, "the flow moves to step S1 in a case where A is larger (higher) than B and the flow moves to step S2 in a case where A is B or less" may be read as that "the flow moves to step S1 in a case where A is B or more and the flow moves to step S2 in a case where A is smaller (lower) than B". Hence, as long as contradictions arise, "A or more" may be read as "larger (higher; longer; more) than A", and "A or less" may be read as "smaller (lower; shorter; less) than A". Hence, "larger (higher; longer; more) than A" may be read as "A or more", and "smaller (lower; shorter; less) than A" may be read as "A or less".

Note that each function unit of each of the above embodiments (each modification) may be or may not be individual hardware. The functions of two or more function units may be implemented by common hardware. Each of a plurality of the functions of one function unit may be implemented by individual hardware. The two or more functions of one function unit may be implemented by common hardware. Furthermore, each function unit may be or may not be implemented by hardware such as an ASIC, an FPGA, or a DSP. For example, a device may include a processor and a memory (storage medium) that stores a control program.

Furthermore, the functions of at least part of function units included in the device may be implemented by the processor by reading and executing the control program from the memory.

The present invention can arrange display images, lenses, displays, or the like at more appropriate positions for eyeballs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-079399, filed on May 12, 2023, which is hereby incorporated by reference herein in its entirety.

What is claimed is:

1. A display device comprising:
a display configured to display an image;
a processor; and
a memory storing a program which, when executed by the processor, causes processor to
(1) acquire an eyeball position of a user,
(2) place the eyeball position in a state other than a predetermined state by performing first control of moving at least one of a display position of the image and a first member of the display to a first target position in a case where the eyeball position is in the predetermined state, and
(3) perform control of causing the display to display at least one of an index indicating a position gazed at by the user and an instruction for the user after the first control, and then perform second control of moving at least one of the display position of the image and the first member at a second target position based on a reaction of the user,
wherein a right eyeball position and a left eyeball position are acquired,
wherein the first member includes (1) a second member for a left eyeball of the user and (2) a third member for a right eyeball of the user,
wherein the display displays (1) a first image for the right eyeball of the user and (2) a second image for the left eyeball of the user, and
wherein the predetermined state is a state where an interval between a center of the right eyeball and a center of the left eyeball is shorter than at least one of (1) an interval between a center of the first image and a center of the second image, and (2) an interval between a center of the second member and a center of the third member.

2. The display device according to claim 1, wherein the first control and the second control are control of moving the display position of the image.

3. The display device according to claim 1, wherein the first control and the second control are control of moving the first member.

4. The display device according to claim 1, wherein, in the second control, the second target position is determined based on the reaction of the user at a time at least one of the index and the instruction for the user is displayed.

5. The display device according to claim 1, wherein control of causing the display to display the index is performed after the first control, and
wherein the reaction of the user is a motion of the user of gazing at the index.

6. The display device according to claim 1, wherein control of causing the display to display an instruction for requesting selection of user information is performed after the first control, and
wherein the reaction of the user is selection of the user information by the user.

7. The display device according to claim 6, further comprising a storage configured to store eyeball information of a plurality of users,
wherein, in the second control, (1) eyeball information corresponding to the selected user information is acquired from the storage, and (2) at least one of the display position of the image and the first member is moved to the second target position based on the acquired eyeball information.

8. The display device according to claim 1, wherein, when the program is executed by the processor, the program further causes processor to measure eyeball information of the user after the second control.

9. The display device according to claim 1, wherein, before the first control, the index indicating the position gazed at by the user, and the instruction for the user are not displayed on the display.

10. The display device according to claim 1, wherein the display device is a head mount display to be attached to a head of the user.

11. A control method of a display device including a display configured to display an image, the control method comprising:
acquiring an eyeball position of a user;
placing the eyeball position in a state other than a predetermined state by performing first control of moving at least one of a display position of the image and a first member of the display to a first target position in a case where the eyeball position is in the predetermined state; and performing control of causing the display to display at least one of an index indicating a position gazed at by the user and an instruction for the user after the first control, and then perform second control of moving at least one of the display position of the image and the first member at a second target position based on a reaction of the user, wherein a right eyeball position and a left eyeball position are acquired, wherein the first member includes (1) a second member for a left eyeball of the user and (2) a third member for a right eyeball of the user, wherein the display displays (1) a first image for the right eyeball of the user and (2) a second image for the left eyeball of the user, and wherein the predetermined state is a state where an interval between a center of the right eyeball and a center of the left eyeball is shorter than at least one of (1) an interval between a center of the first image and a center of the second image, and (2) an interval between a center of the second member and a center of the third member.

12. A non-transitory computer-readable medium that stores a program, wherein the program causes a computer to execute a control method of a display device including a display configured to display an image, the control method comprising:

acquiring an eyeball position of a user;

placing the eyeball position in a state other than a predetermined state by performing first control of moving at least one of a display position of the image and a first member of the display to a first target position in a case where the eyeball position are in the predetermined state; and performing control of causing the display to display at least one of an index indicating a position gazed at by the user and an instruction for the user after the first control, and then perform second control of moving at least one of the display position of the image and the first member at a second target position based on a reaction of the user, wherein a right eyeball position and a left eyeball position are acquired, wherein the first member includes (1) a second member for a left eyeball of the user and (2) a third member for a right eyeball of the user, wherein the display displays (1) a first image for the right eyeball of the user and (2) a second image for the left eyeball of the user, and wherein the predetermined state is a state where an interval between a center of the right eyeball and a center of the left eyeball is shorter than at least one of (1) an interval between a center of the first image and a center of the second image, and (2) an interval between a center of the second member and a center of the third member.

* * * * *